United States Patent [19]
Yoshida

[11] Patent Number: 6,112,871
[45] Date of Patent: Sep. 5, 2000

[54] CLUTCH/BRAKE DEVICE IN PRESS FOR LITTLE NOISE

[75] Inventor: Akihiro Yoshida, Gifu, Japan

[73] Assignee: Yamada Dobby Co., Ltd., Aichiken, Japan

[21] Appl. No.: 09/238,411

[22] Filed: Jan. 28, 1999

[30] Foreign Application Priority Data

| Feb. 17, 1998 | [JP] | Japan | 10-033472 |
| Feb. 17, 1998 | [JP] | Japan | 10-034363 |
| Jul. 29, 1998 | [JP] | Japan | 10-214257 |

[51] Int. Cl.$^7$ .......................... B30B 15/12; B30B 15/10; B30B 15/00
[52] U.S. Cl. .................. 192/18 A; 192/52.6; 192/200
[58] Field of Search ............ 192/18 A, 12 C, 192/52.6, 70.17, 200; 100/282

[56] References Cited

U.S. PATENT DOCUMENTS

| 1,571,746 | 2/1926 | Wemp | 192/200 X |
| 2,167,705 | 8/1939 | Batten . | |
| 2,259,461 | 10/1941 | Eason | 192/70.17 X |
| 2,606,637 | 8/1952 | Davoust | 192/18 A |
| 2,942,708 | 6/1960 | Eason | 192/18 A |
| 3,455,013 | 7/1969 | Rayburn . | |
| 4,004,669 | 1/1977 | Roderick . | |
| 5,257,684 | 11/1993 | Collins | 192/18 A |
| 5,370,045 | 12/1994 | Burns . | |
| 5,564,333 | 10/1996 | Palmer . | |
| 5,577,581 | 11/1996 | Eberwein et al. | 192/18 A |

FOREIGN PATENT DOCUMENTS

| 2 724 995 | 3/1996 | France . |
| 3146830 | 6/1983 | Germany . |
| 9-217771 | 8/1997 | Japan . |

*Primary Examiner*—Rodney H. Bonck
*Attorney, Agent, or Firm*—Arent Fox Kintner Plotkin & Kahn PLLC

[57] ABSTRACT

In order to eliminate noise generated from a clutch disk at racing state of a press, a clutch disk (29) arranged between a flywheel (27) and a working cylinder (40) is provided with a lining applying part (30) of annular shape and a projection (31) mounted on the flywheel (27). On inner circumferential surface of the projection (31), an inner groove part (311) is formed throughout the whole circumference from the inner circumferential edge to the outer circumferential edge in the circumferential direction, and on outer circumferential surface of the projection (31), an outer groove part (312) is formed throughout the whole circumference in the circumferential direction. Thereby the clutch disk (29) has flexibility in the axial direction, and if the lining applying part (30) is pushed by the working cylinder (40), the clutch disk (29) pushes a clutch rotary plate (34) by deflection of the projection (31) in the axial direction and rotates a crank shaft (25).

11 Claims, 14 Drawing Sheets

CLUTCH/BRAKE DEVICE IN PRESS FOR LITTLE NOISE

BACKGROUND OF THE INVENTION (1) Field of the Invention

The present invention relates to a press where clutch performance and brake performance are improved and there is little noise.

(2) Description of the Prior Art

In mechanical presses in general, clutch/brake devices are classified into that of combination type where a clutch disk and a brake disk are mainly constituted as a set, and that of separate type where a clutch device and a brake device are constituted separately. In a clutch/brake device of combination type, timing of the press can be taken mechanically and the brake heating can be made favorable and since a working cylinder, an electromagnetic valve or the like can be used commonly, the device can be manufactured at low cost. Also in a clutch/brake device of separate type, since weight of a rotational part is little and the inertia can be decreased, the stopping performance can be improved.

A clutch/brake device 1 of a press in FIG. 1 shows an example of combination type in the prior art. In FIG. 1, a flywheel 3 is arranged rotatable at one end of a crank shaft 2, and a clutch rotary plate 4 supported to the crank shaft 2 is mounted on the side part of the flywheel 3. Also a brake rotary plate 5 is supported to the end part of the crank shaft 2. The clutch rotary plate 4 and the brake rotary plate 5 are provided with frictional surfaces respectively formed in opposition to each other. A clutch disk 6 with a lining applied thereto is arranged to be pushed to the frictional surface of the clutch rotary plate 5, and a brake disk 7 with a lining applied thereto is arranged to be pushed to the frictional surface of the brake rotary plate 5. The clutch disk 6 is supported to the flywheel 3 and is rotated together with the flywheel 3, and the brake disk 7 is supported to the machine frame 8 and a working cylinder 9 is arranged between the clutch disk 6 and the brake disk 7. The working cylinder 9 is supported to the crank shaft 2, and the clutch disk 6 and the brake disk 7 are moved alternately in pushed state to the respective rotary plates.

Further when air means is introduced the working cylinder 9 pushes the clutch disk 6 to the clutch rotary plate 4 and rotates the crank shaft 2, and when the air means is interrupted the working cylinder 9 stops the rotation of the crank shaft 2.

In the clutch/brake device 1 in the prior art, however, in the state that the clutch disk 6 is rotated together with the flywheel 3, the clutch disk 6 is mounted on the flywheel 3 through a gear or a pin, and the clutch disk 6 can advance or retreat with respect to the flywheel 3. The mounting by the gear system is performed as shown in FIG. 2 so that a ring member 11 mounted on the flywheel 3 and having inner teeth 11a formed at the inner circumferential edge part is meshed with the clutch disk 6 having outer teeth 6a formed throughout the outer circumferential edge part. The mounting by the pin system is performed so that one end of the pin inserted into the clutch disk is fixed to the flywheel. In any case, since the clutch disk 6 can advance or retreat with respect to the flywheel 3, in the case of the pin system, backlash is formed between the inner teeth 11a of the ring member 11 and the outer teeth 6a of the clutch disk 6, and in the case of the pin system, backlash is formed between the pin hole of the clutch disk and the pin. The formation of the backlash not only causes deterioration of the clutch performance, but also in the case that the clutch disk 6 is not pushed to the clutch rotary plate 4, when the clutch disk 6 is rotated together with the flywheel 3, interference is produced between the inner teeth 11a of the ring member 11 and the outer teeth 6a of the clutch disk 6 or between the pin hole of the clutch disk and the pin and noise is generated. Since the noise becomes larger as the backlash becomes larger, this is felt troublesome by the worker operating the press. Therefore it has been required that the noise is made small or eliminated.

SUMMARY OF THE INVENTION

In order to solve the above-mentioned problems in the prior art, an object of the present invention is to provide a press where clutch performance and brake performance can be improved and noise from a clutch device or a brake device can be eliminated.

Therefore a press of the present invention comprises:
   a flywheel rotated by a drive source;
   a crank shaft supported rotatable to a machine frame and arranged so as to penetrate said flywheel;
   a clutch disk supported to said flywheel and being rotatable together with the rotation of said flywheel; and
   a brake disk supported to said machine frame,
   wherein a cylinder member movable between said clutch disk and said brake disk is arranged between said clutch disk and said brake disk,
   said cylinder member pushes said clutch disk to be pushed to a rotary plate fixed to said crank shaft thereby the rotation of said flywheel is transmitted to said crank shaft, and
   said clutch disk has a lining applying part and is mounted on said flywheel through flexible means.

Also it is preferable that a plurality of guide pins are inserted into said clutch disk and fixed to said flywheel, and elastic members are arranged between said clutch disk and said flywheel and respective guide pins are inserted into the elastic members.

Further it is preferable that a jaw part is formed at the head part of said guide pin and restricts moving of said clutch disk.

Also said elastic member may be a dished spring.

Further said elastic member may be a coil spring.

In the press, said flexible means may be constituted in that said clutch disk has an annular projection formed toward the flywheel side at the outer circumferential part of said lining applying part, and said projection is mounted on said flywheel, and a groove part is formed from the inner circumferential edge part of said projection toward the outer circumferential side in the circumferential direction.

Also it is preferable that the groove part is formed throughout the whole circumference at the outer circumferential surface of said projection in the circumferential direction.

Also said projection may be formed integrally with said lining applying part.

Also said projection may be mounted on said lining applying part by fixing means.

Further in a press according to the present invention, a clutch unit is formed on one side of a crank shaft and a brake unit is formed on other side,
   said clutch unit comprising:
      a flywheel being rotatable by a drive source;
      a cylinder rotated together with the flywheel and containing a piston; and
      a clutch disk rotating said crank shaft by pressure of said piston, wherein said clutch disk is provided with a crank shaft mounting part of smaller diameter fixed to said crank shaft and a lining applying part extended from said crank shaft mounting part in the outer diameter direction and formed in larger diameter, and said crank shaft mounting part has flexible means in the axial direction.

Also said flexible means may be provided with a groove part formed on the inner circumferential surface of the crank shaft mounting part of said clutch disk in the circumferential direction.

Further it is preferable that said flexible means is provided with a groove part formed on the outer circumferential surface of the crank shaft mounting part of said clutch disk in the circumferential direction.

Further in a press according to the present invention, a clutch unit is formed on one side of a crank shaft and a brake unit is formed on other side, said brake unit comprising:
a cylinder fixed to a machine frame and containing a piston; and
a brake disk stopping the rotation of said crank shaft by the pressure of said piston,
wherein said brake disk is provided with a crank shaft mounting part of smaller diameter fixed to said crank shaft, and a lining applying part extending from said crank shaft mounting part in the outer diameter direction and formed in larger diameter, and
said crank shaft mounting part has flexible means.

Also said flexible means may be provided with a groove part formed on the inner circumferential surface of the crank shaft mounting part of said brake disk in the circumferential direction.

Further it is preferable that said flexible means is provided with a groove part formed on the outer circumferential surface of the crank shaft mounting part of said brake disk in the circumferential direction.

DESCRIPTION OF THE PREFERRED EMBODIMENTS

An embodiment of the present invention will be described referring to the accompanying drawings as follows. Regarding the following description, a clutch/brake device of combination type will be described as structure of a first press, and a clutch/brake device of separate type will be described as structure of a second press.

Figure 3:
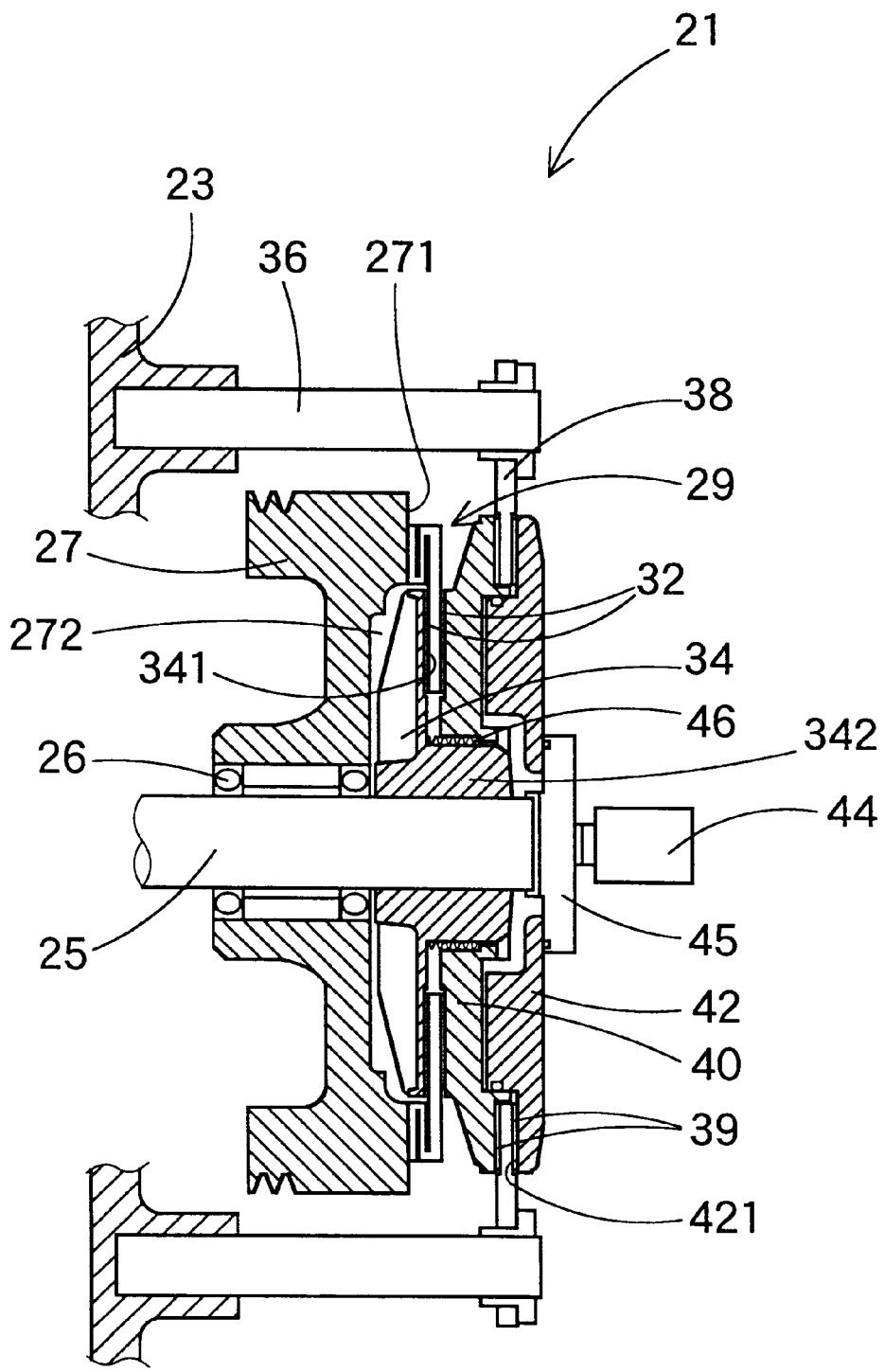
FIG. 3 is a sectional view showing a clutch/brake device of a press in an embodiment of the invention.

In a clutch/brake device of the first type (hereinafter referred to as "clutch/brake device) 21, as shown in FIG. 3, on one end of a crank shaft rotatable to a machine frame 23, a flywheel 27 is supported rotatable through a bearing 26. A clutch disk 29 is mounted on a mounting surface 271 of the right end surface of the flywheel 27, and a clutch rotary plate 34 in key coupling with the crank shaft 25 is arranged within a recess 272 formed on the center part of the right end surface of the flywheel 27 and has a frictional surface 341 formed on the right end surface of larger diameter portion.

Figure 4:
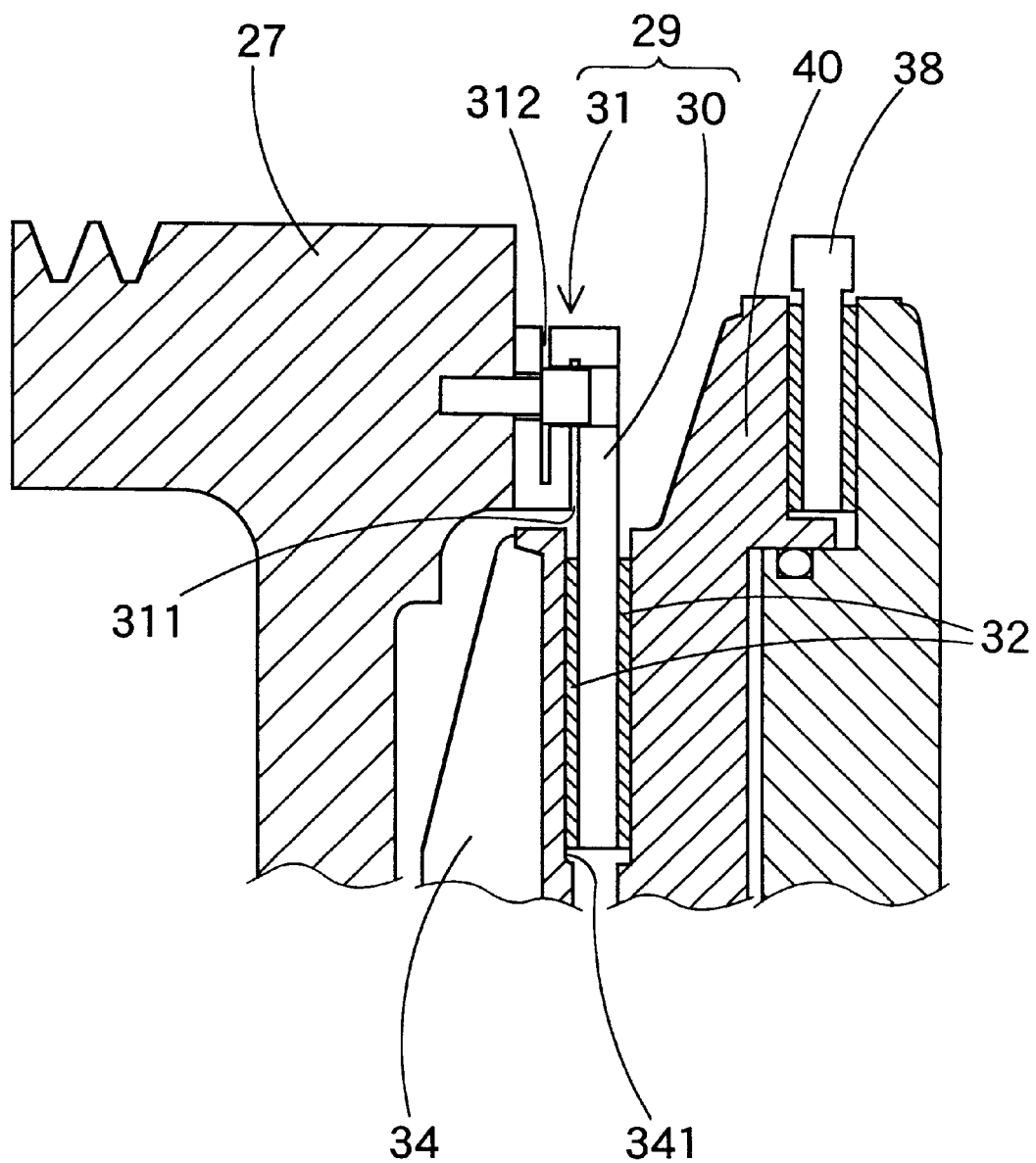
FIG. 4 is a fragmentary enlarged view of FIG. 3.
Figure 5:
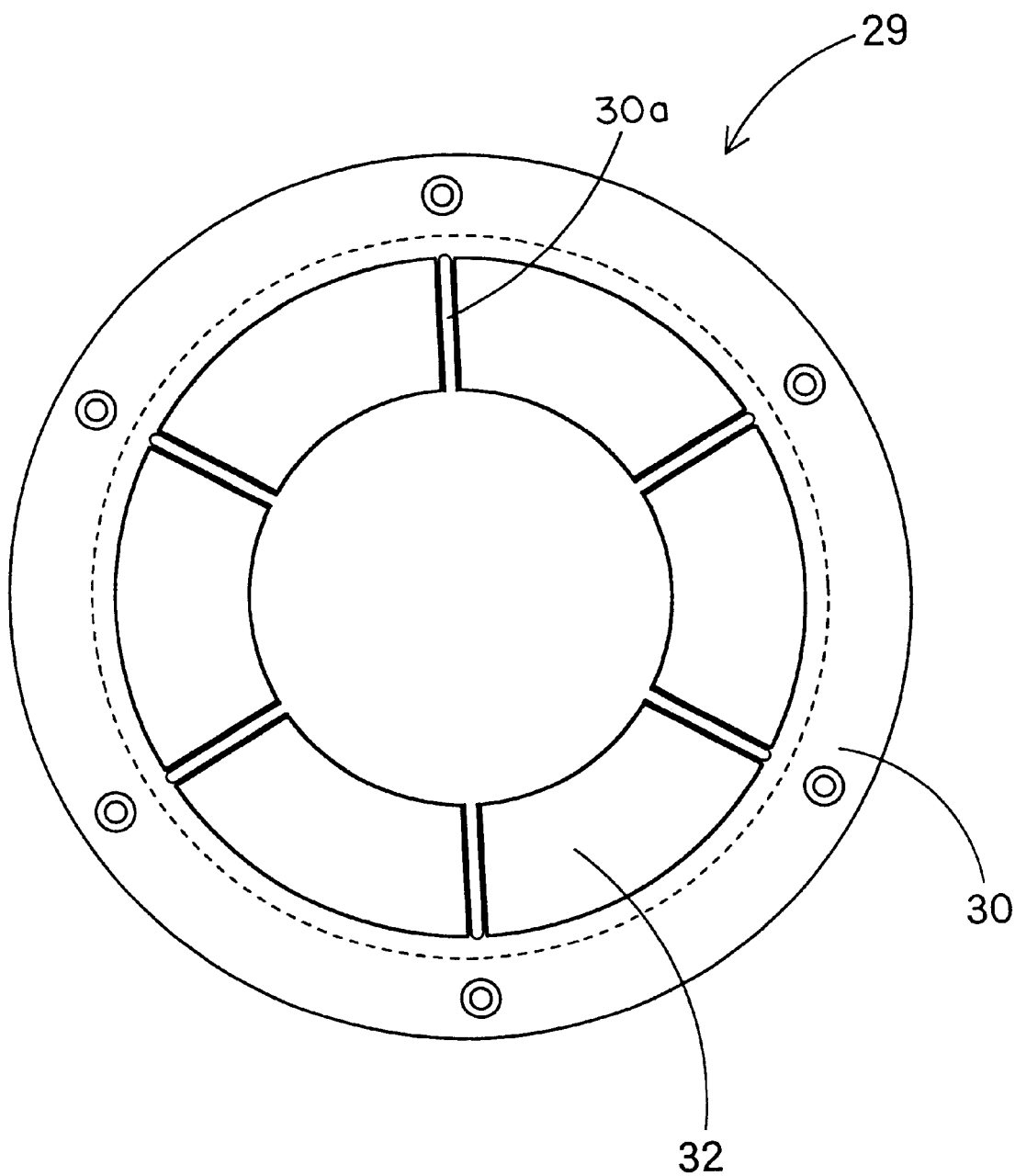
FIG. 5 is a side view of a clutch disk in FIG. 3.

A clutch disk 29 as shown in FIG. 4 comprises a lining applying part 30 formed in annular shape and having a lining 32 mounted thereon, and a projection 31 of annular shape projected on the outer circumferential part of the lining applying part 30 at the side of the flywheel 27. On the end part of the projection 31 at the side of the lining applying part 30, an inner groove part 311 is formed from the inner circumferential edge part of the projection 31 to the outer circumference side throughout the whole circumference in the circumferential direction, and further an outer groove part 312 is formed from the outer circumferential surface to the inside at the center part of the outer circumferential surface of the projection 31 throughout the whole circumference in the circumferential direction. The lining applying part 30 and the projection 31 are formed integrally at the edge part, and the clutch disk 29 is mounted on the mounting surface 271 of the flywheel 27 so as to penetrate the projection 31 by a bolt. Also the lining applying part 30 as shown in FIG. 5, is formed so that a slit 30a is equally divided in six from the inner circumference edge to the outer circumference side. Consequently since the clutch disk 29 has flexibility at the projection 31 having the inner groove part 311 and the outer groove part 312, the flexibility can be provided in the axial direction.

Also in the clutch disk 29 in the natural state, the lining 32 of the clutch disk 29 and the frictional surface 341 of the clutch rotary plate 34 are in separated state, and in the state that the lining 32 of the clutch disk 29 and the frictional surface 341 of the clutch 34 push each other, the clutch disk 29 is operated so as to energize a working cylinder 40 as described later.

The lining 32 is applied to the front surface and the rear surface of the lining applying part 30, and the lining 32 applied to the rear surface of the lining applying part 30 (surface at the side of the flywheel) is arranged so as to be pushed to the frictional surface 341 of the clutch rotary plate 34. Consequently the clutch disk 29 is mounted on the flywheel 27, thereby the clutch ring arranged conventionally can be eliminated. Moreover, since thickness of the lining applying part 30 itself need not be thinned, the clutch disk 29 can be mounted on the flywheel 27 while holding the strength.

Figure 1:
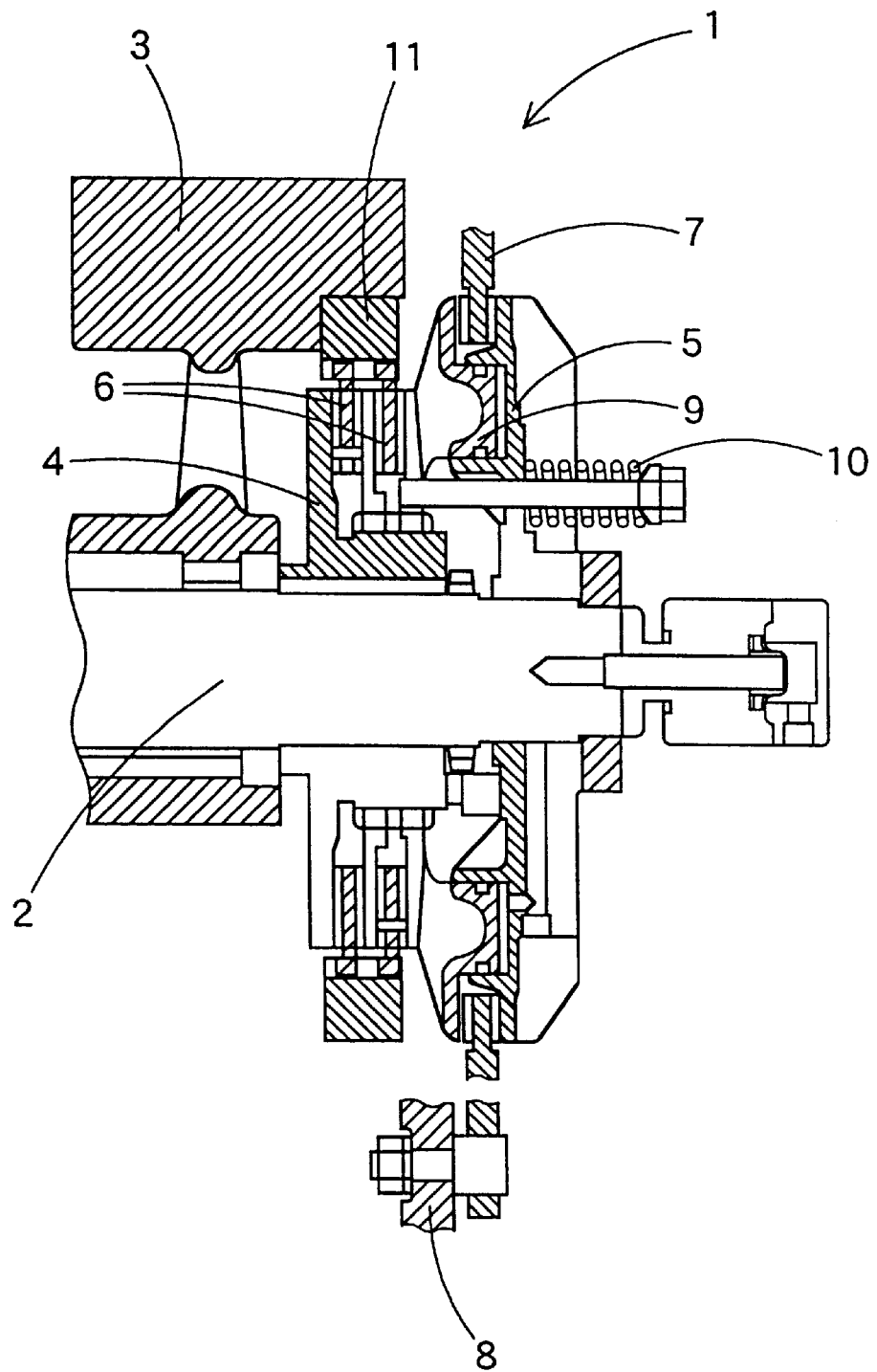
FIG. 1 is a sectional view showing a clutch/brake device of a press in the prior art.
Figure 2:
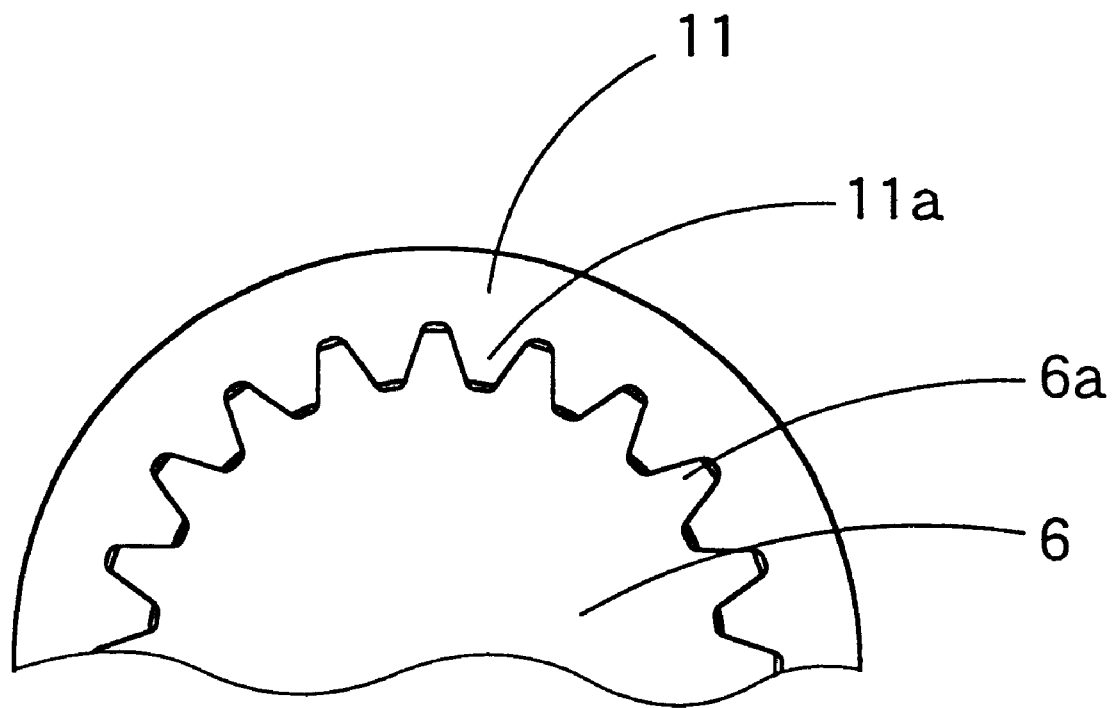
FIG. 2 is a fragmentary enlarged view of a clutch disk in FIG. 1.

On the other hand, brake pins 36 are fixed to the machine frame 23 at two portions so as to be positioned at upper side and lower side of the flywheel 27 and extended in the horizontal direction to the outside (to the right side in FIG. 1), and the upper end part and the lower end part of the brake disk 38 are supported slidable to the end parts of the two brake pins 36. The lining 39 is applied to both surfaces of the brake disk 38, and in order to grasp the lining 39, at the clutch disk side (inside), a working cylinder 40 is supported slidable to a drum part 342 of the clutch rotary plate 34, and at the opposite clutch disk (outside), a brake rotary plate 42 is supported to the crank shaft 25. The working cylinder 40 is fitted at the center part to the brake rotary plate 42 and is formed slidable with the brake rotary plate 42. The left end surface of the working cylinder 40 in FIG. 3 is formed to be pushed to the lining 32 of the clutch disk 29, and the right end surface in the vicinity of the outer circumferential edge part of the working cylinder 40 is formed to be pushed to the lining 39 of the brake disk 38. Further the left end surface of the brake rotary plate 42 in the vicinity of the outer circumferential edge part has a frictional surface 421 and is formed to be pushed to the lining 39 of the brake disk 38, and a rotary seal 44 for the air flowing-in is mounted at the center part through an end plate 45. Also within the working cylinder 40, a plurality of return springs 46 are arranged so as to push the working cylinder 40 to the side of the brake disk 38.

In the clutch/brake device 21 formed as above described, a start button of an operation box (not shown) is operated and the flywheel 27 is rotated (raced) by a motor (not shown), and when the operation button is operated and air is introduced, the clutch is let in and the crank shaft 25 is rotated.

In the racing state, since the working cylinder 40 is moved by the return springs 46 so that a brake disk 38 is pushed to a brake rotary plate 42 and a clutch disk 29 moves the working cylinder 40 to the opposite side of the flywheel by the energizing force of the clutch disk 29 itself, the lining 32 is separated from the clutch rotary plate 34 and the clutch disk 29 is rotated together with the flywheel 27 (the crank shaft 25 is not rotated). Consequently the clutch disk 29 fixed to the flywheel 27 is not slightly moved due to clutch disk 29 itself and the noise generated from the clutch disk 29 is released.

Next, in the state that the clutch is let in, in other words, in the state that the working cylinder 40 is moved to the side of the clutch disk 29 against the biasing force of the return springs 46 by the flowing-in of air, the lining 32 of the clutch disk 29 is pushed to the frictional surface 341 of the clutch rotary plate 34 and the brake disk 38 is separated from the brake rotary plate 42. In this case, the clutch disk 29 is moved to the projection 31 of the clutch disk 29 fixed to the mounting surface 271 of the flywheel 27 so that the lining applying part 30 is deflected to the side of the flywheel 27. In this state, since the clutch disk 29 is restricted by the working cylinder 40, noise is not generated from the clutch disk 29 itself.

Moreover when the clutch disk 29 is moved by the operation cylinder 40, since the biasing force in the reverse direction to the moving of the clutch disk 29 acts on the clutch disk 29 itself, the abrupt strength of pushing the lining 32 of the clutch disk 29 and the frictional surface 341 of the clutch rotary plate 34 with each other can be slightly decreased. This can decrease also the noise generated at the ON state of the clutch.

As above described, since the clutch disk has flexibility in itself and is fixed to the flywheel, noise is not generated at the racing state.

Figure 6:
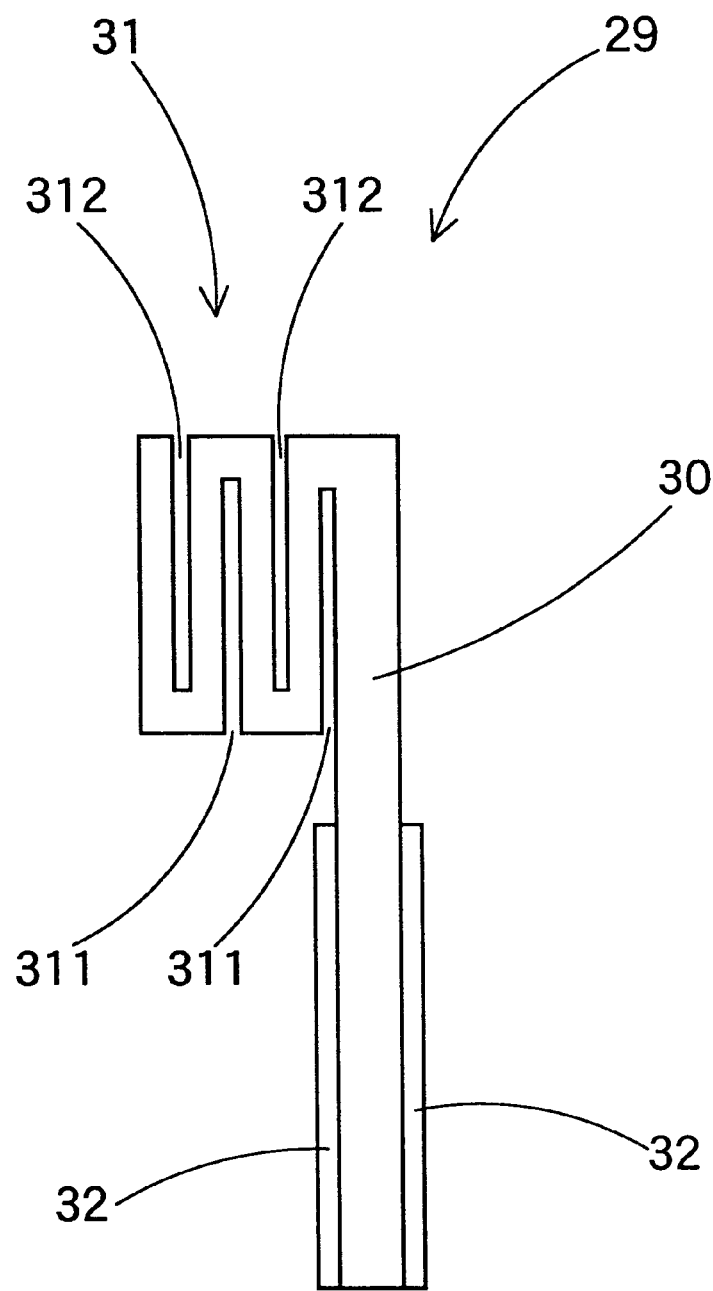
FIG. 6 is a diagram showing another embodiment of a clutch disk.

In addition, the clutch disk is not limited to that formed integrally in annular shape as above described, but may be divided into plural pieces and also as shown in FIG. 6, inner groove parts 311 and outer groove parts 312 formed in the projection 31 may be arranged respectively in two in number, and further may be formed in three in number. In this case, the clutch disk may be liable to be deflected further.

Figure 7:
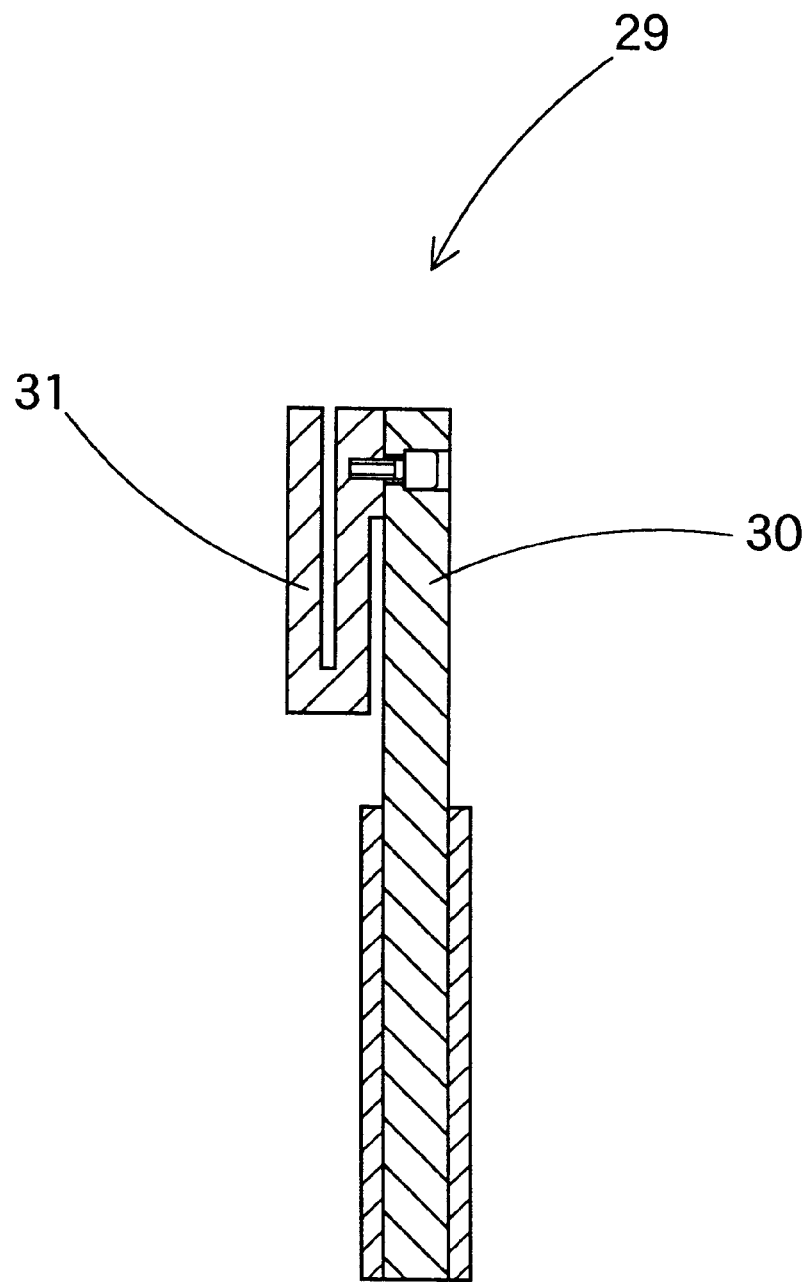
FIG. 7 is a diagram showing another embodiment of a clutch disk.

Further in a clutch disk shown in FIG. 7, a lining applying part 30 and a projection 31 are constituted separately and fixed by a bolt. In this case, the lining applying part 30 and the projection 31 can be designed having sufficient strength respectively.

Figure 8:
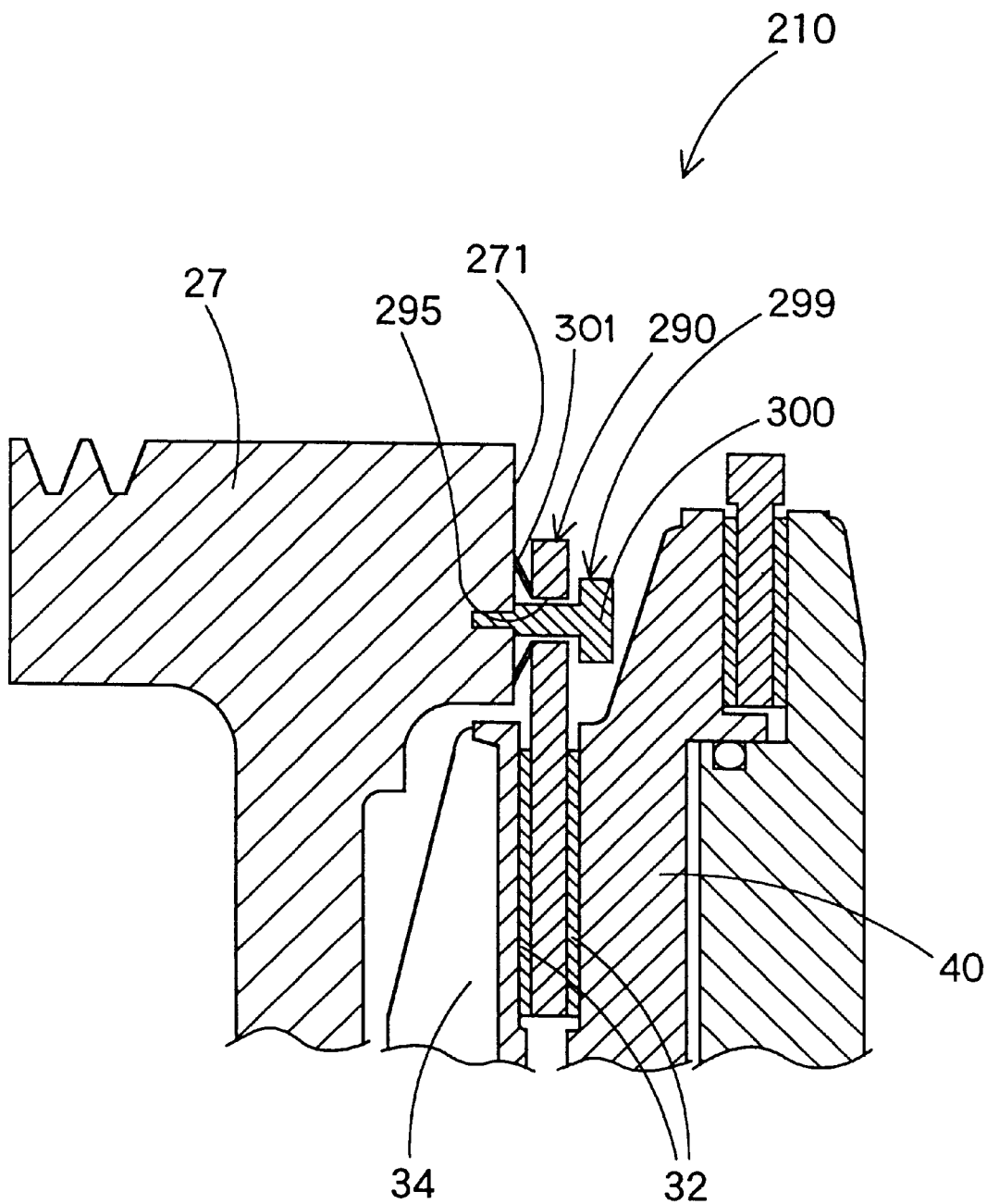
FIG. 8 is a diagram showing another embodiment of a clutch disk.
Figure 9:
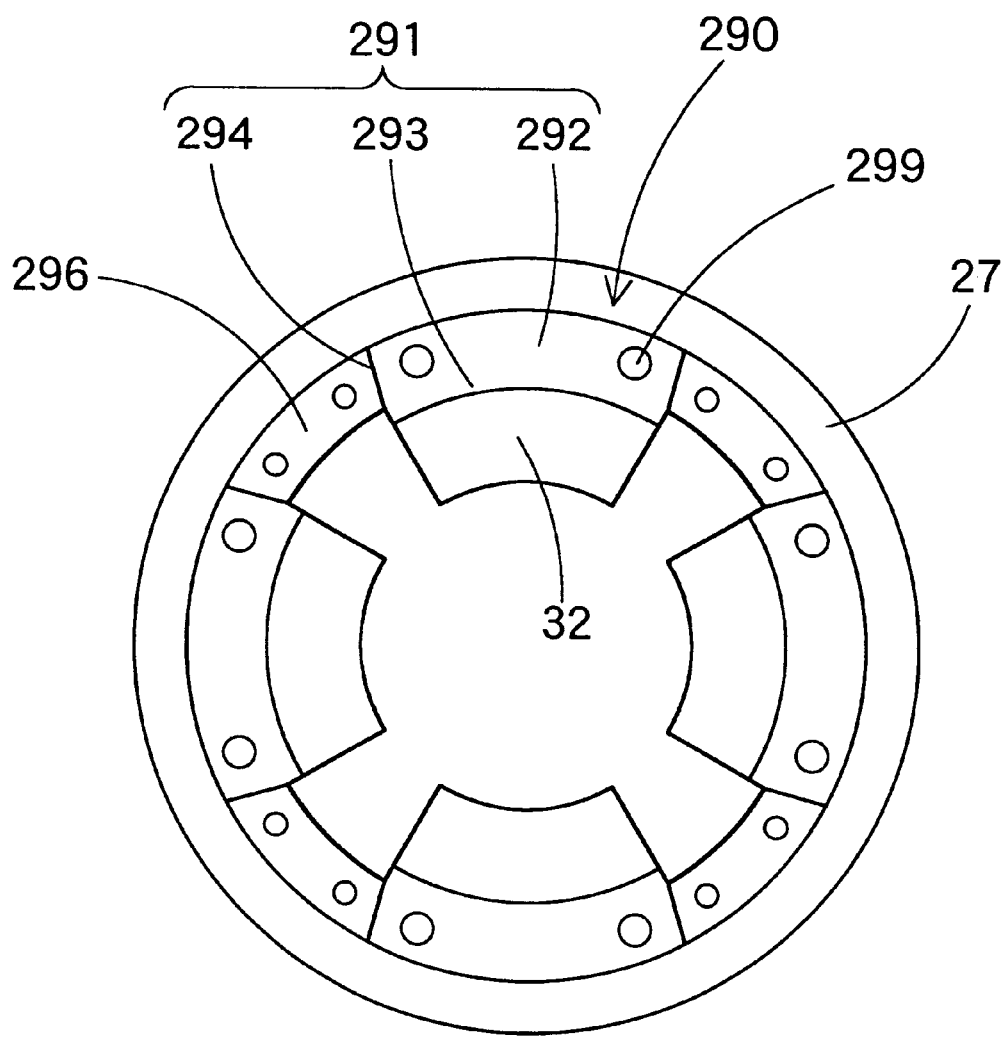
FIG. 9 is a diagram showing a side surface of the clutch disk in FIG. 8.

Further a clutch/brake device 210 in FIGS. 8 and 9 is constituted in that an elastic member is interposed between a clutch disk and a flywheel thereby the clutch disk is provided with flexibility. A clutch disk 290 as shown in FIG. 9 is constituted by divided disks 291 in substantially riceball shape divided in plural number (four in this embodiment), and side plates 296 mounted between respective divided disks 291 along the circumferential direction. Each divided disk 291 is supported by a guide pin 299 mounted on the flywheel 27, and a dished spring 301 is arranged between the flywheel 27 and the divided disk 291 and the guide pin 299 is inserted into the dished spring 301 thereby the divided disk 291 can be moved on the guide pin 299.

The divided disk 291 as shown in FIG. 9 comprises an outer edge part 292 positioned at the side of a mounting surface 271 of the flywheel 27 and a lining applying part 293 positioned at the side of a recess 272 of the flywheel 27, and on both end surfaces of the outer edge part 292 are formed pushing surfaces 294 capable of being pushed to the side surfaces of the side plate 296. A lining 32 is applied on the front surface and the rear surface of the lining applying part 293. The pushing surfaces 294 of the divided disk 291 are slanted with respect to the center line of the divided disk 291 so as to be tapered toward the axial center side, and the side plates 296 arranged between the respective divided disks 291 can be moved and adjusted in the radial direction along the slant surfaces of the pushing surfaces 294. Thereby the backrush between the divided disks 291 and the side plates 296 can be adjusted.

Also as shown in FIG. 8, the guide pin 299 is inserted into a pin hole 295 formed on the divided disk 291 and the dished spring 301 interposed between the flywheel 27 and the divided disk 291 and is threadedly engaged with the flywheel 27, and a jaw 300 is provided at the side of the head part of the guide pin 299 so that the motion of the divided disk 291 in the axial direction is restricted.

Consequently the clutch disk 290 pushed by the working cylinder 40 makes the lining 32 to be pushed to the clutch rotary plate 34 against the biasing force of the dished spring 301, and when the pushing of the working cylinder 40 is released, the clutch disk 290 is released from the clutch rotary plate 34 by the biasing force of the dished spring 301.

The elastic member need not be the dished spring 301 as above described but may be a coil spring, and further may be another elastic member.

Next, a clutch/brake device of a press in a second embodiment will be described. The clutch/brake device in this embodiment (hereinafter referred to as "clutch/brake device") comprises a clutch unit 60 shown in FIG. 10 and a brake unit 70 shown in FIG. 11, and both units are separated from each other and constitute a separate type.

Figure 10:
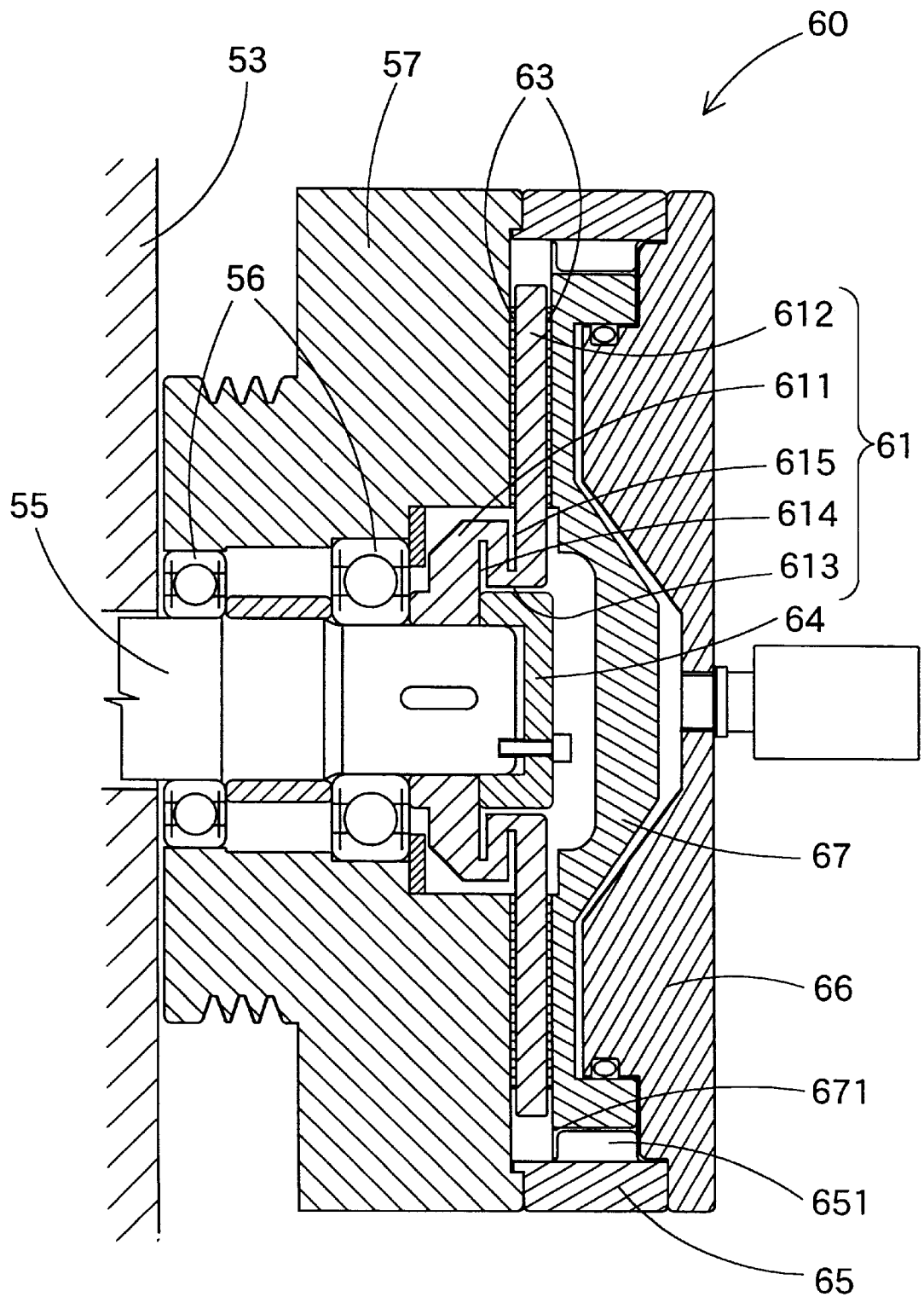
FIG. 10 is a sectional view showing a clutch unit of a press of separate type in the invention.

In the clutch unit 60 in FIG. 10, a flywheel 57 is supported rotatable through a bearing 56 to the right end part of a crank shaft 55 supported rotatable to a machine frame 53. A clutch disk 61 fixed to the crank shaft 55 by the key tightening is arranged so as to be opposed to the right end surface of the flywheel 57. The clutch disk 61 is provided with a crank shaft mounting part of small diameter (hereinafter referred to as "mounting part") 611 fixed to the crank shaft 55, and a lining applying part 612 of disk shape extended to the outside from the mounting part 611 for applying the lining 63 on both surfaces. The lining applying part 612 is opposed to the right end surface of the flywheel 57.

An opening 613 is formed at the right end part of the mounting part 611 of the clutch disk 61 so that an end plate 64 fixing the position of the clutch disk 61 and the flywheel 57 is arranged, and an inner groove part 614 having larger diameter than that of the opening 613 is formed from the bottom surface of the opening 613 along the circumferential direction. Further on the outer circumferential surface of the mounting part 614, an outer groove part 615 is formed so as to be adjacent to the side of the left end surface of the lining applying part 612 and positioned to the side of the outer end surface from the inner groove part 614 (at the right side in the figure). Consequently the clutch disk 61 is formed from the mounting part 611 to the lining applying part 612 in cross-section of crank shape, and moreover elasticity (flexibility) is provided in the axial direction of the crank shaft 55.

A piston guide 65 with inner teeth 651 formed thereon is arranged on the outer part of the flywheel 57, and a cylinder 66 together with the piston guide 65 to be fixed to the flywheel 57 by a bolt is arranged on the outer end surface of the piston guide 65. A piston 67 having outer teeth 671 to be meshed with the inner teeth 651 of the piston guide 65 is arranged within the cylinder 66. The piston 67 is moved in the axial direction due to air introducing of an air generating device (not shown) and pushes the lining 63 applied to the clutch disk 61.

Consequently if air is introduced while the flywheel is rotated, the piston 67 acts and pushes the clutch disk 61, and the lining applying part 612 of the clutch disk 61 is deflected with respect to the mounting part 611 thereby the lining 63 is pressure contacted with the flywheel 57 and the crank shaft 55 is rotated.

Figure 11:
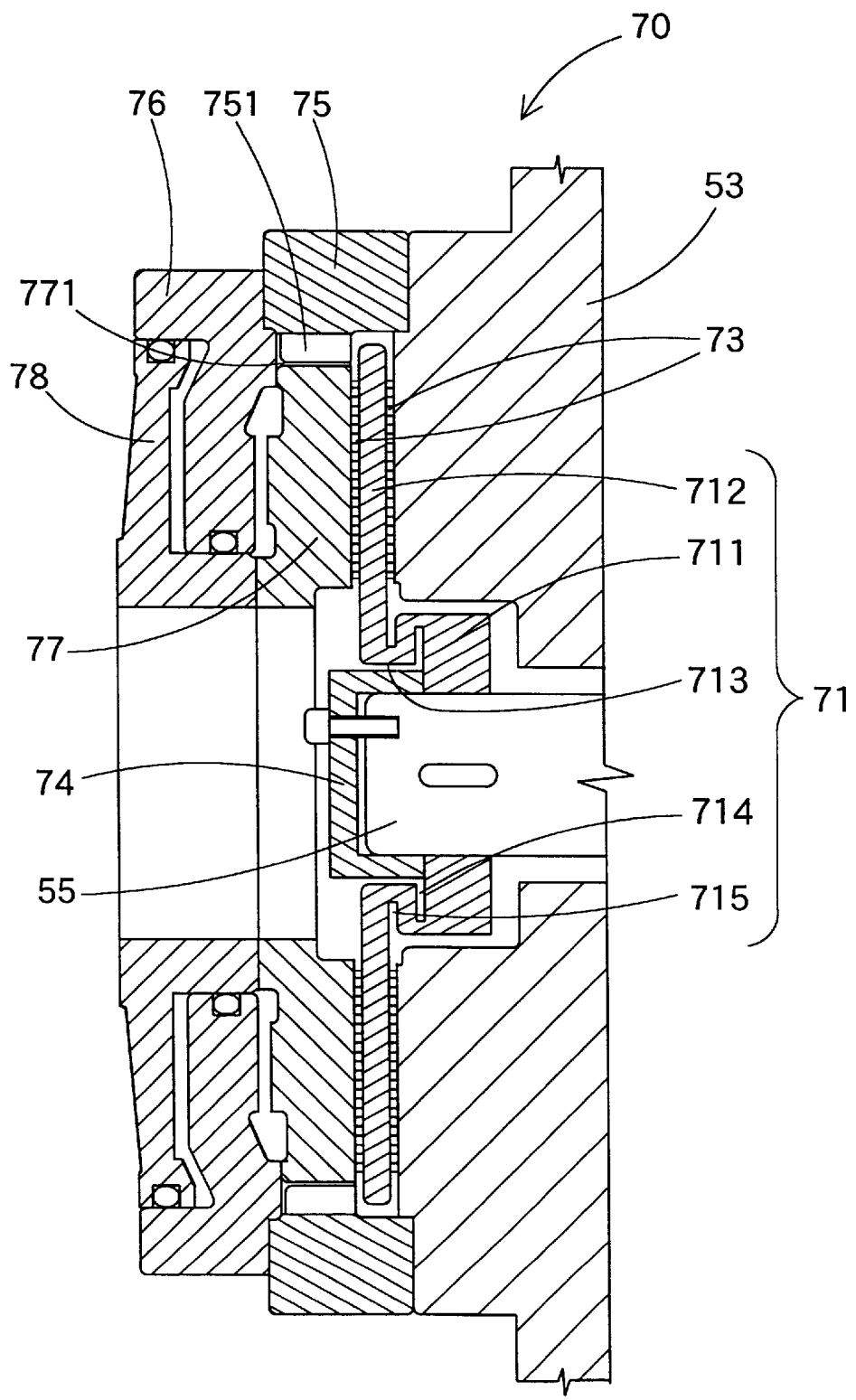
FIG. 11 is a sectional view showing a brake unit of a press of separate type in the invention.

In the brake unit 70 as shown in FIG. 11, at the left end part of the crank shaft 55, the brake disk 71 is fixed to the crank shaft 55 due to the key coupling. The brake disk 71 is provided with a crank shaft mounting part of small diameter (hereinafter referred to as "mounting part") 711 to be fixed to the crank shaft 55, and a lining applying part 712 of disk shape extended outward from the mounting part 711 and applying a lining 73 to both surfaces. The lining applying part 712 is opposed to the left end surface of the machine frame 53.

At the left end part of the mounting part 711 of the brake disk 71, an opening 713 is formed so that an end plate 74 to fix the position of the brake disk 71 is arranged, and an inner groove part 714 having larger diameter than that of the opening 713 is formed from the bottom surface of the opening 713 along the circumferential direction. Further on the outer circumferential surface of the mounting part 711, an outer groove part 715 is formed so as to be adjacent with the side of the left end surface of the lining applying part 712 and positioned at the outer circumferential surface side (to the left side in the figure) from the inner groove part 714. Consequently the brake disk 71 with the cross-section in crank shape is formed from the mounting part 711 to the lining applying part 712, moreover elasticity (flexibility) is provided in the axial direction of the crank shaft 55.

A piston guide 75 with inner teeth 751 formed thereon is arranged at the outer edge part of the machine frame 53, and a cylinder 76 fixed together with the piston guide 75 to the machine frame 53 by a bolt is arranged from the outer end surface of the piston guide 75. A piston 78 is arranged within the cylinder 76 in the movable state in the axial direction of the crank shaft 55, and the piston 78 is fixed to a brake ring 77 having outer teeth 771 meshed with the inner teeth 751 of the piston guide 75. The piston 78 is moved in the axial direction due to air introducing of an air generating device (not shown), and pushes the lining 73 applied to the brake disk 71 through the brake ring 77.

Consequently if air is introduced while the crank shaft 55 is rotated, the piston 78 acts and pushes the brake disk 71 and the lining applying part 712 of the brake disk 71 is deflected with respect to the mounting part 711 thereby the lining 73 is brought into pressure contact with the machine frame 53 and the rotation of the crank shaft 55 is stopped.

Figure 12:
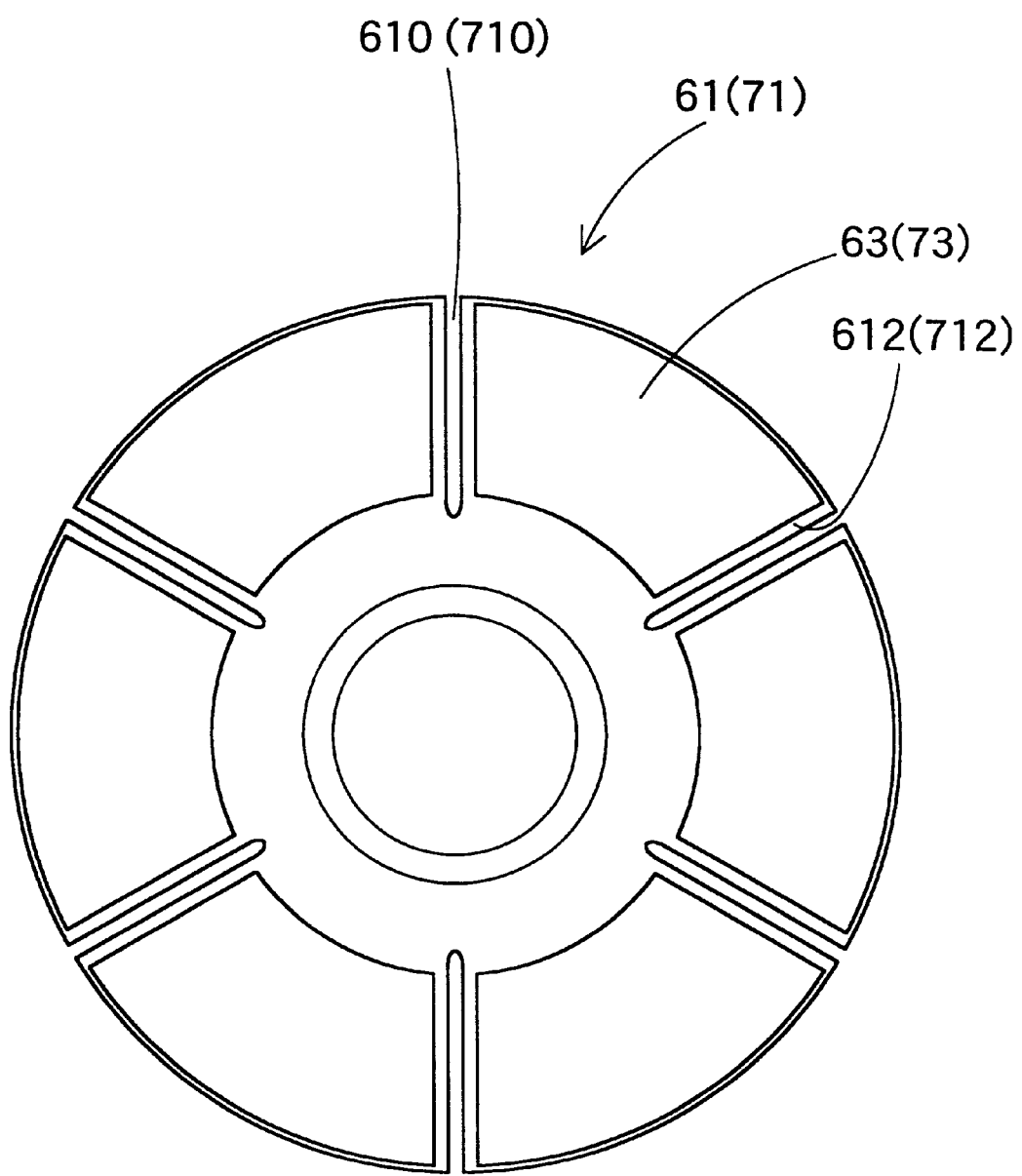
FIG. 12 is a side view of a clutch disk (brake disk) in FIG. 10 (FIG. 11)

In the clutch disk 61 and the brake disk 71 in this embodiment, although the lining applying parts 612 and 712 are formed in disk shape, in order to improve the elastic force, as shown in FIG. 12, slit-shaped grooves 610, 710 in dividing equally in six radially may be formed from the outer edge part to the inside. In this case, also the linings 63 and 73 are divided equally in six radially.

Figure 13:
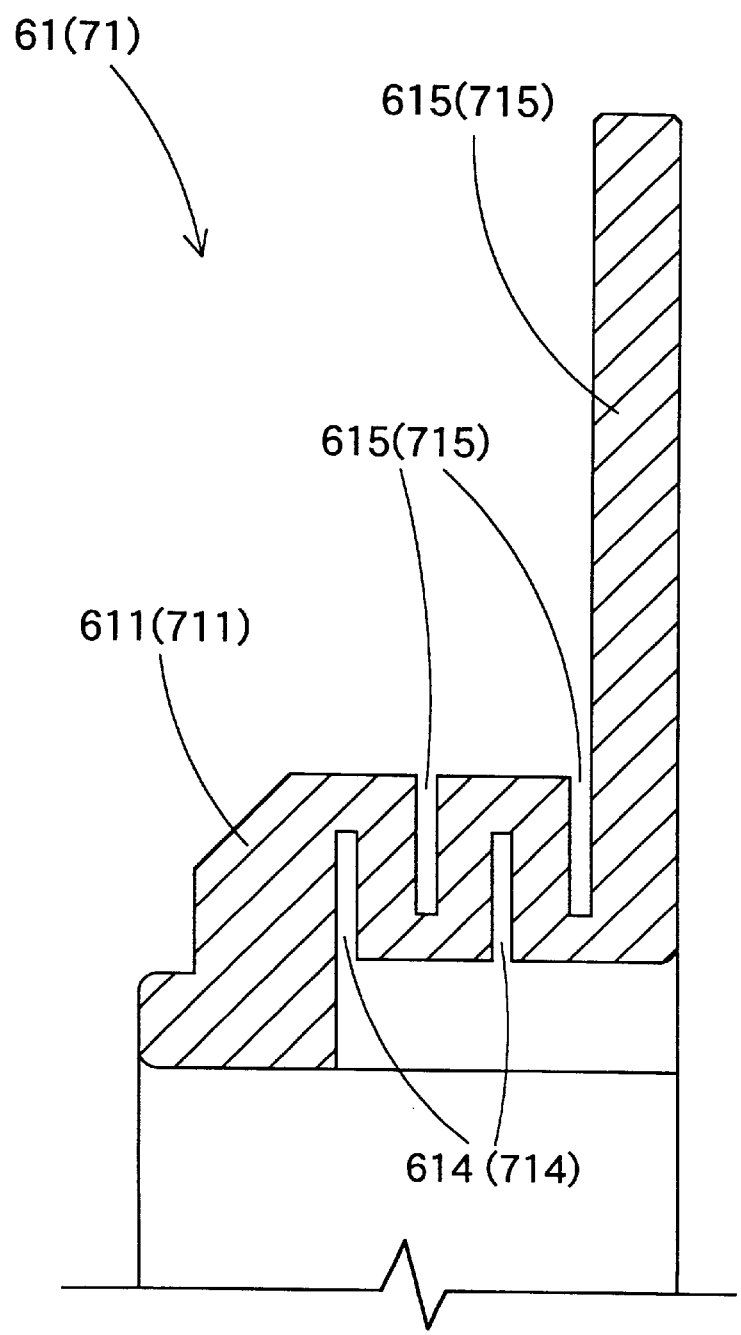
FIG. 13 is a diagram showing another embodiment of a clutch disk (brake disk) in FIG. 10 (FIG. 11)

Also in the mounting parts 611 and 711 of the clutch disk 61 and the brake disk 71, in order to improve the flexibility, as shown in FIG. 13, two sets of the inner groove parts 614, 714 and two sets of the outer groove parts 615, 715 may be provided respectively.

Figure 14:
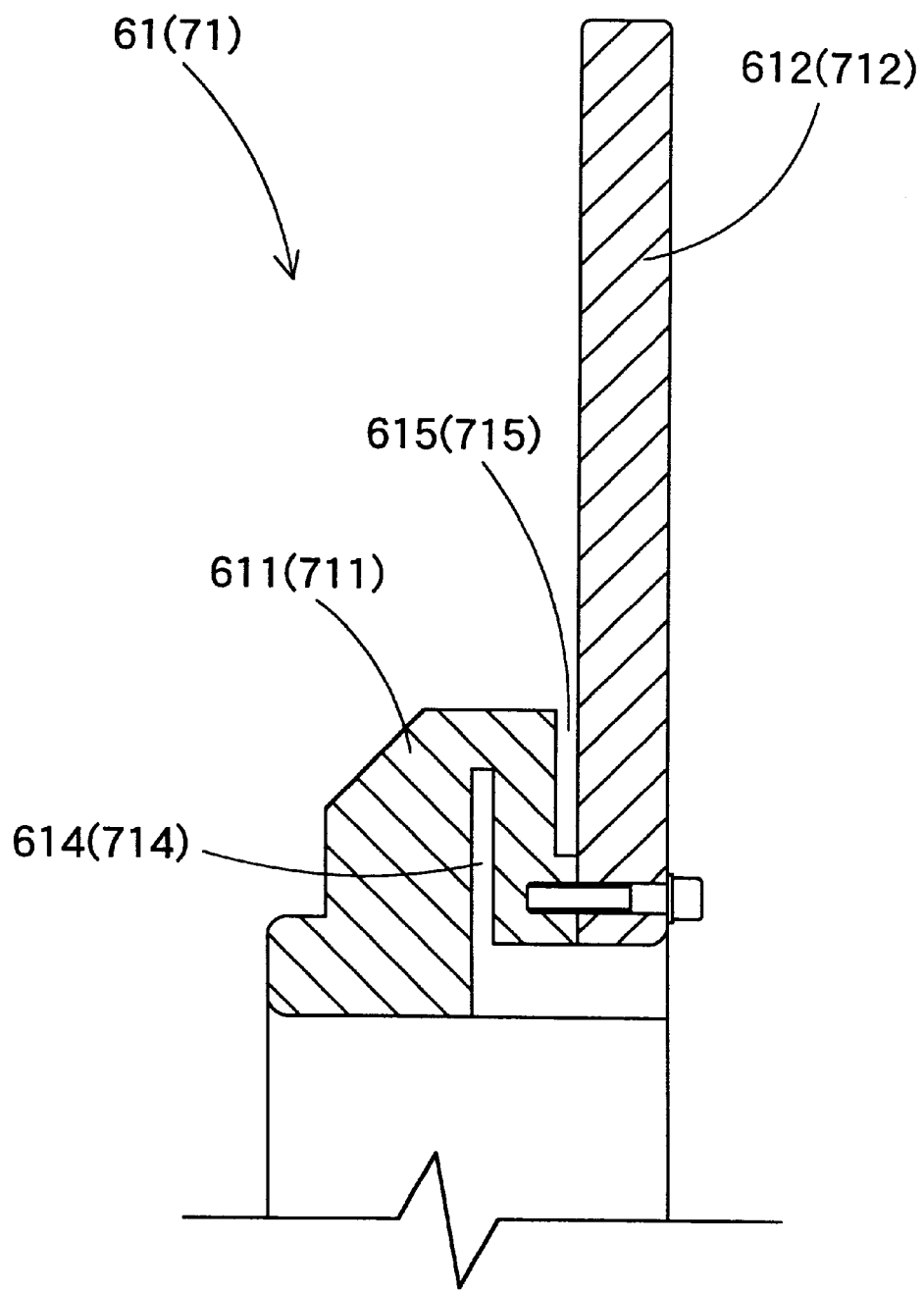
FIG. 14 is a diagram showing still another embodiment of a clutch disk (brake disk) in FIG. 10 (FIG. 11).

Further in order to facilitate the machining of the clutch disk 61 and the brake disk 71, as shown in FIG. 14, the mounting parts 611, 711 and the lining applying parts 612, 712 may be formed separately and may be tightened by bolts.

In the clutch/brake device formed as above described, a start button of an operation box (not shown) is operated and the flywheel 57 is rotated (raced) by a motor (not shown). In this state, in the brake unit 70, air is supplied and the piston 78 through the brake ring 77 pushes the brake disk 71 to be pressure contacted with the machine frame 53. In the clutch unit 60, while the piston 67 together with the flywheel 57 is rotated, since the clutch disk 61 and the piston 67 are separated from each other, the rotation of the crank shaft 55 is stopped. In this case, in the state that the clutch disk 61 is not subjected to the pressure by the piston 67 since the lining applying part 612 has flexibility to the mounting part 611, it is set that the flywheel 57 and the flywheel side lining 63 of the lining applying part 612 are slightly separated from each other in the natural state of the applying part 612.

Next, if the operation button is operated, air is supplied to the clutch unit 60 and at the same time the air supply to the brake unit 70 is stopped. The clutch disk 61 is pushed by the air pressure, and the piston 67 of the clutch unit 60 pushes the lining 63 at the side of the flywheel 57 to be pressure contacted with the flywheel 57. Since the lining applying part 612 of the clutch disk 61 has flexibility to the mounting part 611 due to the inner groove part 614 and the outer groove part 615 formed in the mounting part 611, the whole circumferential surface of the lining 63 is pressure contacted uniformly and efficiently with the flywheel 57 by the pressure of the piston 67. In this case, since the piston 78 of the brake unit 70 together with the brake ring 77 is separated from the machine frame 53 and the pressure contact state is released, the crank shaft 55 is transmitted from the rotational force of the flywheel 57 through the clutch disk 51 and is rotated. Consequently the clutch performance can be improved by the efficient pressure contact of the lining 63 with the flywheel 57.

Next, if the stop button is operated, the air supply to the clutch unit 60 is stopped and the air is supplied to the brake unit 70 and the rotation of the crank shaft 55 is stopped. Since the pressure contact action of the brake disk 71 to the machine frame 53 is similar to that of the clutch disk 61, as a result, the brake performance can be improved.

What is claimed is:

1. A press comprising:

(a) a flywheel rotated by a drive source;

(b) a crank shaft rotatably supported by a machine frame and arranged to penetrate said flywheel;

(c) a clutch disk mounted on said flywheel and rotates with said flywheel during rotation of said flywheel;

(d) a brake disk supported by said machine frame;

(e) a cylinder member arranged between said clutch disk and said brake disk and being movable between said clutch disk an said brake disk, said cylinder member pushing said clutch disk toward a rotary plate fixed to said crank shaft so the rotation of said flywheel is transmitted to said crank shaft; and (f) said clutch disk has a lining applying part and is mounted on said flywheel by flexible means, wherein said flexible means is constituted in that said clutch disk has an annular projection formed toward the flywheel side at the outer circumferential part of said lining applying part, and said projection is mounted on said flywheel, and a groove part is formed from the inner circumferential edge part of said projection toward the outer circumferential side in the circumferential direction.

2. A press as set forth in claim 1, wherein a plurality of guide pins are inserted into said clutch disk and fixed to said flywheel, and elastic members are arranged between said clutch disk and said flywheel and respective guide pins are inserted into the elastic members.

3. A press as set forth in claim 2, wherein a jaw is formed at the head part of said guide pin and restricts moving of said clutch disk.

4. A press as set forth in claim 2, wherein said elastic member is a dished spring.

5. A press as set forth in claim 1 wherein the groove part is formed throughout the whole circumference at the outer circumferential surface of said projection in the circumferential direction.

6. A press as set forth in claim 5 wherein said projection is formed integrally with said lining applying part.

7. A press as set forth in claim 5, wherein said projection is mounted on said lining applying part by fixing means.

8. A press, wherein (a) a clutch unit is formed on a first end of crank shaft and a brake unit is formed on the other end;

(b) said clutch unit comprising a flywheel being rotatable by a drive source, a cylinder rotated together with the flywheel and containing a piston, and clutch disk rotating said crank shaft by a pressure of said piston; and (c) said clutch disk is provided with a crank shaft mounting part of smaller diameter fixed to said crank shaft and aligning applying part extending from said crank shaft mounting part in an outer diameter direction and formed in larger diameter, and said crank shaft mounting part has flexible means in an axial direction, wherein said flexible means is provided with a groove part formed on the inner circumferential surface of the crank shaft mounting part of said clutch disk in the circumferential direction.

9. A press as set forth in claim 8, wherein said flexible means is provided with a groove part formed on the outer circumferential surface of the crank shaft mounting part of said clutch disk in the circumferential direction.

10. A press, wherein (a) clutch unit is formed on a first and of crank shaft and a brake unit is formed on the other end;

(b) said brake unit comprising a cylinder fixed to a machine frame and containing a piston, and a brake disk stopping rotation of said crank shaft by a pressure of said piston; and (c) said brake disk is provide with a crank shaft mounting part of smaller diameter fixed to said crank shaft, and a lining applying part extending from said crank shaft mounting part in an outer diameter direction and formed in larger diameter, and said crank shaft mounting part has flexible means in an axial direction, wherein said flexible means is provided with a groove part formed on the inner circumferential surface of the crank-shaft mounting part of said brake disk in the circumferential direction.

11. A press as set forth in claim 10, wherein said flexible means is provided with a groove part formed on the outer circumferential surface of the crank shaft mounting part of said brake disk in the circumferential direction.

* * * * *